(12) United States Patent
Renz et al.

(10) Patent No.: US 9,706,791 B2
(45) Date of Patent: Jul. 18, 2017

(54) AROMA PARTICLES

(71) Applicant: SYMRISE AG, Holzminden (DE)

(72) Inventors: Karl-Heinz Renz, Holzminden (DE); Birgit Schleifenbaum, Hoexter (DE); Jens Uhlemann, Holzminden (DE); Fouad Saleeb, Pleasantville, NY (US)

(73) Assignee: SYMRISE AG, Holzminden (DE)

( * ) Notice: Subject to any disclaimer, the term of this patent is extended or adjusted under 35 U.S.C. 154(b) by 0 days.

(21) Appl. No.: 14/154,511

(22) Filed: Jan. 14, 2014

(65) Prior Publication Data

US 2014/0127390 A1    May 8, 2014

Related U.S. Application Data

(60) Continuation of application No. 12/561,798, filed on Sep. 17, 2009, now Pat. No. 8,641,945, which is a division of application No. 10/512,841, filed as application No. PCT/EP03/04383 on Apr. 26, 2003, now abandoned.

(30) Foreign Application Priority Data

Apr. 30, 2002 (DE) .................................. 102 19 228

(51) Int. Cl.

| | | |
|---|---|---|
| A23L 1/22 | (2006.01) | |
| A23F 3/40 | (2006.01) | |
| A23G 4/20 | (2006.01) | |
| A23L 2/39 | (2006.01) | |
| A23L 2/56 | (2006.01) | |
| C08L 3/02 | (2006.01) | |
| C11D 3/50 | (2006.01) | |
| C11B 9/00 | (2006.01) | |
| C11D 9/44 | (2006.01) | |
| A23L 27/00 | (2016.01) | |

(52) U.S. Cl.
CPC .......... *A23L 1/22091* (2013.01); *A23F 3/405* (2013.01); *A23G 4/20* (2013.01); *A23L 2/39* (2013.01); *A23L 2/56* (2013.01); *A23L 27/70* (2016.08); *A23L 27/72* (2016.08); *A23L 27/88* (2016.08); *C08L 3/02* (2013.01); *C11B 9/00* (2013.01); *C11D 3/505* (2013.01); *C11D 9/442* (2013.01); *A23V 2002/00* (2013.01)

(58) Field of Classification Search
CPC ........ A23L 1/22091; C11D 9/442; C11B 9/00
See application file for complete search history.

(56) References Cited

U.S. PATENT DOCUMENTS

| | | | |
|---|---|---|---|
| 2,856,291 A | 3/1957 | Schultz | |
| 3,704,137 A | 11/1972 | Beck | |
| 4,499,112 A | 2/1985 | Miller | |
| 4,689,235 A | 8/1987 | Barnes et al. | |
| 4,707,367 A | 11/1987 | Miller | |
| 4,820,534 A * | 4/1989 | Saleeb et al. ................... | 426/96 |
| 5,009,900 A | 4/1991 | Levine et al. | |
| 5,476,675 A | 12/1995 | Lou et al. | |
| 5,496,574 A | 3/1996 | Rushmore et al. | |
| 5,603,971 A * | 2/1997 | Porzio et al. ................... | 426/96 |
| 5,972,395 A * | 10/1999 | Saleeb et al. ................... | 426/96 |
| 6,156,807 A | 12/2000 | Kaitou et al. | |
| 6,190,591 B1 | 2/2001 | van Lengerich | |
| 6,436,453 B1 | 8/2002 | van Lengerich et al. | |
| RE37,860 E * | 9/2002 | Blake et al. .................. | 426/534 |
| 6,797,290 B2 | 9/2004 | Dartey et al. | |
| 6,902,751 B1 | 6/2005 | Schleifenbaum et al. | |
| 6,927,195 B2 | 8/2005 | Birch et al. | |
| 2001/0036503 A1 | 11/2001 | Benczedi et al. | |
| 2002/0117769 A1 | 8/2002 | Arch et al. | |

FOREIGN PATENT DOCUMENTS

| | | |
|---|---|---|
| EP | 1034705 | 2/2000 |
| EP | 1123660 | 8/2001 |
| JP | 7502187 | 3/1994 |
| JP | 8509018 | 10/1994 |
| JP | 2000297293 | 10/2000 |
| JP | 3165438 | 5/2001 |
| WO | 94/06308 | 3/1994 |
| WO | 00/25606 | 5/2000 |
| WO | 01/17372 | 3/2001 |
| WO | 02/00039 | 1/2002 |

OTHER PUBLICATIONS

Tate, et al., Star-Dri Maltodextrins & Corn Syrup Solids, Sep. 26, 2008, pp. 1-12.

\* cited by examiner

*Primary Examiner* — Lanee Reuther
(74) *Attorney, Agent, or Firm* — Duane Morris LLP; J. Rodman Steele, Jr.; Gregory M. Lefkowitz

(57) ABSTRACT

The invention relates to vitreous aroma particles and the preparation thereof, as well as to the use thereof in foods, consumer articles and pharmaceuticals.

12 Claims, No Drawings

US 9,706,791 B2

AROMA PARTICLES

CROSS REFERENCE TO RELATED APPLICATIONS

This application is a continuation application of U.S. patent application Ser. No. 12/561,798, filed Sep. 7, 2009, which is a divisional application of U.S. patent application Ser. No. 10/512,841, filed Apr. 1, 2005, which is a §371 national phase application of PCT/EP2003/004383, filed Apr. 26, 2003, which claims priority to German Patent Application No. 10219228.6, filed Apr. 30, 2002, all of which are incorporated herein by reference.

SUMMARY OF THE INVENTION

The invention relates to vitreous aroma particles and the preparation thereof, as well as to the use thereof in food products, consumer articles and pharmaceuticals.

In the present invention, an aroma is understood to be a substance which brings about odour impressions and/or flavour impressions. It can be constituted here by individual substances or individual materials, or by mixtures. An aroma is also understood to be olfactory substances, aroma substances, flavour substances, perfume oils, fragrances, olfactory substance compositions, fragrance mixtures and the like.

Aroma particles (encapsulated aroma) are understood in the present invention to be encapsulations which comprise the encapsulating material (the matrix) and an aroma. The matrices mentioned hereinbelow are vitreous and are also described as glasses.

Aromas are generally highly complex mixtures, that is to say combinations of many chemical substances having different chemical and physical properties. As the need for stable products in a very wide variety of applications such as food products, consumer articles and pharmaceuticals increases, there is a growing need for encapsulation of such aromas.

The best possible protection in the matrix, or the maximum durability, is generally sought.

Aroma losses during encapsulation should be minimised and aroma retention during storage maximised. Above and beyond this, for aroma utilisation to be cost-effective for the user a high payload plus high retention of the volatile aromas are important. Retrieval in the encapsulated product of those aroma substances utilised by way of the recipe is described as "retention".

A further aim is a freely adjustable particle size within the range 0.1 to 5 mm, with a narrow size distribution. A virtually spherical product or a cylindrical product having a diameter:length ratio close to 1 is sought.

Encapsulated aromas having particularly good stability in storage are generally prepared in the aroma industry by emulsification of the aroma in molten carbohydrate mixtures, followed by forming or comminution. Older processes (for example U.S. Pat. No. 4,707,367, U.S. Pat. No. 4,499,112) operate in batch-wise manner with stirred tanks. More recently, a continuous procedure in twin-screw extruders has proved to be particularly advantageous (for example U.S. Pat. No. 5,603,971, WO 94/06308, U.S. Pat. No. 5,009,900).

In extrusion, continuous cylindrical strands are first obtained whereof the diameter is determined by the diameter of the drilled holes of the perforated disk which is used. As a result of comminution in a downstream mechanical comminution process (for example a pelletiser or crusher), the continuous strand is divided into cylindrical sections. If the strand diameter exceeds the desired final diameter, the strand must be broken additionally in the direction of its axis.

At all events, the comminution step destroys the surface structure of the particles. A disadvantage associated with this is an elevated loading with an oily layer of the aroma which is utilised. The oily layer of the aroma which is utilised, which is on the surface causes the particles to adhere, as well as greatly impairing the stability of the particles in storage. An undesirably high proportion of fine dust is, moreover, formed.

BACKGROUND OF THE INVENTION

U.S. Pat. No. 4,820,534 discloses a method for fixing labile substances such as, for example, essential oils in an extruded glass, characterised in that the quantitatively more important component present in a proportion by weight of at least 70% is a maltodextrin having a DE (dextrose equivalent) of up to 20. The resulting matrix is a hard, non-hygroscopic glass from which encapsulated essential oils or other aromas can be prepared without the addition of emulsifiers and flow promoting agents. In order to obtain small particle sizes, in particular particles smaller than 1 mm, coarse strands must first be prepared which are subsequently comminuted and sieved in a labour-intensive process, as a result of which undesirable dusty fines arise. A direct processing of this glass by way of perforated disks having small openings (smaller than 1 mm) is not possible because, at the necessary temperatures, undesirable aroma losses and aroma reactions, as well as carbonisation and blockages in the extruder, would result.

U.S. Pat. No. 5,972,395 discloses the use of a quantitatively subordinate proportion by weight, of from 15 to 30%, of the maltodextrin having a dextrose equivalent of up to 20. The encapsulation of water-insoluble lipophilic fish oil or of solid labile components such as carotene and maltol is described. These materials have only a slight plasticising effect on the matrix. This method cannot, however, be applied to the encapsulation of commercial aromas because practically all natural, nature-identical or artificial aromas contain components which act as highly effective plasticisers of the carbohydrate matrix according to U.S. Pat. No. 5,972,395, as a result of which the glass becomes sticky and difficult to process.

Very hard glasses make processing difficult on account of their high melt viscosity, such that flow through small openings is no longer possible. Soft matrices are impossible, or difficult, to process by way of melt extrusion and integrated comminution because the melt is too soft and the particles formed tend to adhere. This problem occurs in particular when the melt is discharged through small openings. In addition, soft glasses can result in undesirably large drops of the aroma in the matrix and hence even in efflux of the aroma in liquid form.

Carbohydrate matrices and processes for the preparation thereof are therefore sought which enable aromas to be encapsulated in a stable manner by means of melt extrusion and die-face pelletisation, while not having the disadvantages of the prior art which have been described. In the present invention, die-face pelletisation is understood to be a comminution, directly at the extruder exit, of the melt discharged from the extruder. The still soft surface structure is sealed by the action of the die-face pelletisation.

DETAILED DESCRIPTION OF THE INVENTION

The present invention provides vitreous aroma particles prepared by extrusion of an aromatised melt, followed by die-face pelletisation, characterised in that the matrix of the particles contains from 20 to 80 wt. %, preferably 30 to 70 wt. %, particularly preferably 40 to 60 wt. %, carbohydrate polymers having an average molecular weight greater than 1000, the aromatised melt is discharged from the extruder by way of an opening and is comminuted in the still unsolidified state.

The present invention also provides a process for the preparation of the aroma particles according to the invention, as well as the use thereof in foods, pharmaceuticals and consumer articles.

The carbohydrate polymers used are prepared by acid or enzymatic hydrolysis of starch. Starch is a long-chain glucose polymer.

Complete acid hydrolysis of starch results in glucose. In enzymatic hydrolysis of starch the glucose dimer, maltose, can also be produced. The characteristic value by which the degree of decomposition of the starch is measured is the "dextrose equivalent" (DE), which can take the limit values 0 for the long-chain glucose polymer and 100 for the pure glucose. The water-solubility of the starch degradation products increases as the DE value increases. Starch degradation products having a DE of less than 10 are sparingly soluble in water.

According to a rough formula known from the literature (H. Levine, L. Slade: "Water as a plasticizer: physicochemical aspects of low moisture polymeric systems", in Water Science Reviews, 1988, Vol. 3, F. Franks (Ed.), pp. 79-185, Cambridge University Press, Cambridge, England), the average molecular weight of the starch degradation products is inversely proportional to the DE value: 1 average molecular weight=18016 DE All the data which follow relating to the average molecular weight of the starch degradation products are obtained by way of this rough formula. It should be pointed out at this point that other methods of determining the molecular weights (for example gel chromatography or calorimetry) may possibly lead to widely diverging results.

Now, when the starch decomposes (DE markedly less than 10, average molecular weight far above 2000) maltodextrins (DE 10 to 20, average molecular weight 1000 to 2000) arise initially, which can be degraded further to glucose syrups (DE>20, average molecular weight less than 1000) comprising monomeric sugars.

Maltodextrins substantially comprise polymers having a degree of polymerisation (degree of polymerisation DP) of the glucose starting at 4 (maltotetraose, molecular weight 720) and above. They contain only smaller quantities of monomeric sugars such as glucose (DP 1, molecular weight 180.2), maltose (DP 2, molecular weight 360.4) and maltotriose (DP 3, molecular weight 540.6).

In a preferred embodiment maltodextrins having dextrose equivalents within the range 10 to 20 may be used. Maltodextrins having a DE of 15 to 19 are particularly preferred. Here, the plant which originally supplied the starch for the preparation of the starch hydrolysates is immaterial. Maize-based raw materials are suitable and readily available, in order to guarantee a product that is free from genetically modified constituents raw materials from tapioca, rice, wheat, potatoes can, for example, also be utilised.

Maltodextrins increase the binding of aromas in the matrix. The carbohydrate polymers have melting points greater than 190° C., preferably greater than 200° C. The carbohydrate polymers used have glass transition temperatures of over 70° C., preferably over 80° C., in particular preferably over 90° C.

The proportion of from 70 to 30 wt. %, which is complementary to the carbohydrate polymer content of 30 to 70 wt. %, embraces water-soluble, low molecular weight compounds having molecular weights within the range 90 to 950 and a melting point within the range 80° C. to 180° C.

Suitable water-soluble, low molecular weight compounds are, for example, monosaccharides, disaccharides and trisaccharides, sugar alcohols, solid food acids or mixtures thereof. Particularly suitable monosaccharides, disaccharides and trisaccharides are, for example, arabinose, xylose, fructose, galactose, glucose, mannose, sorbose, lactose, maltose, saccharose, maltotriose.

Particularly suitable sugar alcohols are, for example, mannitol, sorbitol, xylitol, arabinol, arabitol, adonitol, alditol, ducitol, iditol.

Particularly suitable food acids are, for example, citric acid, adipic acid, malic acid, fumaric acid, succinic acid, lactic acid, benzoic acid.

If there exist isomers of the named compounds, the pure isomers or any mixtures thereof may be used.

The matrix of the particles preferably additionally contains an emulsifier. The additional incorporation of a small quantity, from 0.5 to 3 wt. %, of monoglycerides (a specific class of emulsifiers) into the matrix is advantageous in order to facilitate flow of the melt through openings (for example of a pelletising die) less than 1.0 mm in size.

Decaglycerol dipalmitate, hexaglycerol distearate, polyglycerol esters, sulfoacetates, lecithin are also suitable as emulsifiers.

It has also been found that a minimum quantity of glucose in the matrix enables die-face pelletisation to take place without the undesirable formation of fines and without adhesion of the freshly formed particles. A glucose content of from 0.5 to 5 wt. % in the matrix is particularly preferred.

The use of maltotriose, which can improve holding-back of the aroma, thus making possible a higher aroma payload, is furthermore advantageous. If, with a higher aroma payload, a greater proportion of the undesirable oily layer of the aroma utilised, which arises during comminution, should occur, a convective treatment with inert gas (for example nitrogen, noble gases, air) can be effected in order to remove this oily layer.

The water-soluble low molecular weight compounds reduce the softening point of the matrix: the higher the proportion thereof in the mixture, the more readily the matrix can be melted. The processing temperature is reduced thereby. The product strands are, however, more difficult to cut, and the pellets are less stable to humidity and temperature. The low molecular weight compounds additionally facilitate pelletisation at the pelletising dies. The product becomes glass-hard more rapidly. If, however, excessive quantities of low molecular weight compounds are utilised the product already adheres at the pelletising die. In storage too, increased sticking occurs.

The aroma particles according to the invention typically have a glass transition temperature within the range 30 to 100° C., preferably within the range 45 to 75° C., particularly preferably within the range 50 to 60° C. The glass transition temperatures were obtained by means of differential scanning calorimetry (DSC, heating rate 20 K/min).

The aroma particles preferably have a cylindrical or spherical geometry and a narrow particle size profile. They have a diameter of from 0.1 to 5 mm, preferably 0.2 to 2.5 mm, in particular preferably 0.3 to 1.5 mm, and a length of from 0.1 to 10 mm, preferably 0.2 to 3.0 mm, in particular preferably 0.3 to 1.5 mm.

The aroma particles according to the invention are highly stable in storage. The aroma particles according to the invention are on the surface practically free from any oily layer of the aroma which is utilised. The aroma is practically exclusively in the interior of the particles. If necessary, flow promoting agents may be added to the aroma particles in order to reduce still further the stickiness of the matrix.

The aroma particles according to the invention have an aroma content of from 0.5 to 25 wt. %, preferably 1 to 20 wt. %, in particular preferably 3 to 15 wt. %, in relation to the total weight of aroma particles.

Examples of olfactory substances which may be a constituent of the aroma, are found, for example, in S. Arctander, Perfume and Flavor Materials, Vols. I and II, Montclair, N.J., 1969, published by the author, or K. Bauer, D. Garbe and H. Surburg, Common Fragrance and Flavor Materials, 3$^{rd}$ Edition, Wiley-VCH, Weinheim 1997.

The following might be named individually: extracts from natural raw materials such as essential oils, concretes, absolutes, resins, resinoids, balsams, tinctures such as, for example, ambergris tincture; amyris oil, angelica seed oil; angelica root oil; aniseed oil; valerian oil, basil oil; tree moss absolute; bay oil; mugwort oil; benzoin resin; bergamot oil; beeswax absolute; birch tar oil; bitter almond oil; savory oil; buchu leaf oil; cabreuva oil; cade oil; calmus oil; camphor oil; cananga oil; cardamom oil; cascarilla oil; cassia oil; cassia absolute; castoreum absolute; cedar leaf oil; cedar wood oil; cistus oil; citronella oil; lemon oil; copaiba balsam; copaiba balsam oil; coriander oil: costus root oil; cumin oil; cypress oil; davana oil; dill herb oil; dill seed oil; eau de brouts absolute; oak moss absolute; elemi oil; tarragon oil; eucalyptus citriodora oil; eucalyptus oil; fennel oil; fir-needle oil; galbanum oil; galbanum resin; geranium oil; grapefruit oil; guaiac wood oil; gurjun balsam; gurjun balsam oil; helichrysum absolute; helichrysum oil; ginger oil; iris root absolute; iris root oil; jasmine absolute; calmus oil; camomile oil, blue; camomile oil, Roman; carrot seed oil; cascarilla oil; pine-needle oil; spearmint oil; caraway oil; labdanum oil; labdanum absolute; labdanum resin; lavandin absolute; lavandin oil; lavender absolute; lavender oil; lemongrass oil; lovage oil; lime oil, distilled; lime oil, pressed; linaloe oil; Litsea cubeba oil; laurel leaf oil; mace oil; marjoram oil; mandarin oil; massoia bark oil; mimosa absolute; ambrette seed oil; musk tincture; clary sage oil; nutmeg oil; myrrh absolute; myrrh oil; myrtle oil; clove leaf oil; clove flower oil; neroli oil; frankincense absolute; frankincense oil; opopanax oil; orange flower absolute; orange oil; origanum oil; palmarosa oil; patchouli oil; perilla oil; Peruvian balsam oil; parsley leaf oil; parsley seed oil; petitgrain oil; peppermint oil; pepper oil; pimento oil; pine oil; pennyroyal oil; rose absolute; rosewood oil; rose oil; rosemary oil; sage oil, Dalmation; sage oil, Spanish; sandalwood oil; celery seed oil; spike lavender oil; star anise oil; styrax oil; tagetes oil; fir-needle oil; tea tree oil; terpentine oil; thyme oil; Tolu balsam; tonka absolute; tuberose absolute; vanilla extract; violet leaf absolute; verbena oil; vetiver oil; juniper oil; wine lees oil; absinthe oil; wintergreen oil; ylang oil; hyssop oil; civet absolute; cinnamon leaf oil; cinnamon bark oil; as well as fractions thereof, and constituent substances isolated therefrom;

Individual olfactory substances from the group of hydrocarbons such as, for example, 3-carene; α-pinene; β-pinene; α-terpinene, γ-terpinene, p-cymene; bisabolene; camphene; caryophyllene; cedrene; farnesene; limonene; longifolene; myrcene; ocimene; valencene; (E,Z)-1,3,5-undecatriene; of aliphatic alcohols such as, for example, hexanol; octanol; 3-octanol; 2,6-dimethylheptanol; 2-methylheptanol, 2-methyloctanol; (E)-2-hexenol; (E)- and (Z)-3-hexenol; 1-octen-3-ol; mixture of 3,4,5,6,6-pentamethyl-3/4-hepten-2-ol and 3,5,6,6-tetramethyl-4-methylene-heptan-2-ol; (E,Z)-2,6-nonadienol; 3,7-dimethyl-7-methoxyoctan-2-ol; 9-decenol; 10-undecenol; 4-methyl-3-decen-5-ol; of aliphatic aldehydes and 1,4-dioxacycloalken-2-ones thereof, such as, for example, hexanal; heptanal; octanal; nonanal; decanal; undecanal; dodecanal; tridecanal; 2-methyloctanal; 2-methylnonanal; (E)-2-hexenal; (Z)-4-heptenal; 2,6-dimethyl-5-heptenal; 10-undecenal; (E)-4-decenal; 2-dodecenal; 2,6,10-trimethyl-5,9-undecadienal; heptanal diethylacetal; 1,1-dimethoxy-2,2,5-trimethyl-4-hexene; citronellyl oxyacetaldehyde;

of aliphatic ketones and oximes thereof, such as, for example, 2-heptanone; 2-octanone; 3-octanone; 2-nonanone; 5-methyl-3-heptanone; 5-methyl-3-heptanone oxime; 2,4,4,7-tetramethyl-6-octen-3-one; of aliphatic sulfur-containing compounds such as, for example, 3-methylthiohexanol; 3-methylthiohexyl acetate; 3-mercaptohexanol; 3-mercaptohexyl acetate; 3-mercaptohexyl butyrate; 3-acetylthiohexyl acetate; 1-menthene-8-thiol.

of aliphatic nitriles such as, for example, 2-nonene nitrile; 2-tridecene nitrile; 2,12-tridecadiene nitrile; 3,7-dimethyl-2,6-octadien-e nitrile; 3,7-dimethyl-6-octene nitrile;

of aliphatic carboxylic acids and esters thereof such as, for example, (E)- and (Z)-3-hexanyl formate; ethyl acetoacetate; isoamyl acetate; hexyl acetate; 3,5,5-trimethylhexyl acetate; 3-methyl-2-butenyl acetate; (E)-2-hexenyl acetate; (E)- and (Z)-3-hexenyl acetate; octyl acetate; 3-octyl acetate; 1-octen-3-yl acetate; ethyl butyrate; butyl butyrate; isoamyl butyrate; hexyl butyrate; (E)- and (Z)-3-hexenyl isobutyrate; hexyl crotonate; ethyl isovalerate; ethyl-3-methylpentanoate-; ethyl hexanoate; allyl hexanoate; ethyl heptanoate; allyl heptanoate; ethyl octanoate; ethyl-(E,Z)-2,4-decadienoate; methyl-2-octynoate; methyl-2-nonynoate; allyl-2-isoamyl oxyacetate; methyl-3,7-dimethyl-2,6-o-ctadienoate;

of acyclic terpene alcohols such as, for example, citronellol; geraniol; nerol; linalool; lavandulol; nerolidol; farnesol; tetrahydrolinalool; tetrahydrogeraniol; 2,6-dimethyl-7-octen-2-ol; 2,6-dimethyloctan-2-ol; 2-methyl-6-methylene-7-octen-2-ol; 2,6-dimethyl-5,7-octadien-2-ol; 2,6-dimethyl-3,5-octadien-2-ol; 3,7-dimethyl-4,6-octadien-3-ol; 3,7-dimethyl-1,5,7-octatrien-3-ol; 2,6-dimethyl-2,5,7-octatrien-1-ol; as well as formates, acetates, propionates, isobutyrates, butyrates, isovalerates, pentanoates, hexanoates, crotonates, tiglinates, 3-methyl-2-butenoates thereof;

of acyclic terpene aldehydes and acyclic terpene ketones, such as, for example, geranial; neral; citronellal; 7-hydroxy-3,7-dimethyloctanal; 7-methoxy-3,7-dimethyloctanal; 2,6,10-trimethyl-9-undecenal; geranyl acetone; as well as the dimethyl and diethyl acetals of geranial, neral, 7-hydroxy-3,7-dimethyloctanal;

of cyclic terpene alcohols such as, for example, menthol; isopulegol; alpha-terpineol; terpinenol-4; menthan-8-ol; menthan-1-ol; menthan-7-ol; borneol; isoborneol; linalool oxide; nopol; cedrol; ambrinol; vetiverol; guaiol; as well as formates, acetates, propionates, isobutyrates, butyrates, isovalerates, pentanoates, hexanoates, crotonates, tiglinates, 3-methyl-2-butenoates thereof;

of cyclic terpene aldehydes, and cyclic terpene ketones, such as, for example, menthone; isomenthone; 8-mercapto-menthan-3-one; carvone; camphor; fenchone; alpha-ionone; beta-ionone; alpha-n-methylionone; beta-n-methylionone; alpha-isomethylionone; beta-isomethylionone; alpha-irone; alpha-damascone; beta-damascone; beta-damascenone; delta-damascone; gamma-damascone; 1-(2,4,4-trimethyl-2- cyclohexen-1-yl)-2-buten-1-one; 1,3,4,6,7,8a-hexahydro-1,1,5,5-tetramethyl-2H-2,4-a-methanona-phthalen-8(5H)-one; nootkatone; dihydronootkatone; alpha-sinensal; beta-sinensal; acetylated cedar wood oil (methyl cedryl ketone);

of cyclic alcohols such as, for example, 4-tert.-butylcyclohexanol; 3,3,5-trimethylcyclohexanol; 3-isocamphylcyclohexanol; 2,6,9-trimethyl-Z2,Z5,E9-cyclododecatrien-1-ol; 2-isobutyl-4-methyltetrah-ydro-2H-pyran-4-ol;

of cycloaliphatic alcohols such as, for example, alpha,3,3-trimethylcyclohexylmethanol; 2-methyl-4-(2,2,3-trimethyl-3-cyclopent-1-yl)butanol; 2-methyl-4-(2,2,3-trimethyl-3-cyclopent-1-yl)-2-buten-1-ol; 2-ethyl-4-(2,2,3-trimethyl-3-cyclopent-1-yl)-2-buten-1-ol; 3-methyl-5-(2,2,3-trimethyl-3-cyclopent-1-yl)pentan-2-ol; 3-methyl-5-(2,2,3-trimethyl-3-cyclopent-1-yl)-4-penten-2-ol; 3,3-dimethyl-5-(2,2,3-trimethyl-3-cyclopent-1-yl)-4-penten-2-ol; 1-(2,2,6-trimethylcyclohexyl)pentan-3-ol; 1-(2,2,6-trimethylcyclohexyl)he-xan-3-ol;

of cyclic and cycloaliphatic ethers, such as, for example, cineole, cedryl methyl ether; cyclododecyl methyl ether; (ethoxymethoxy)cyclododec-ane; alpha-cedrene epoxide; 3a-6,6,9a-tetramethyldodecahydronaphtho[2,1-b]furan; 3a-ethyl-6,6,9a-trimethyldodecahydronaptho[2,1-b]furan; 1,5,9-trimethyl-13-oxabicyclo[10.1.0]trideca-4,8-diene; rose oxide; 2-(2,4-dimethyl-3-cyclohexen-1-yl)-5-methyl-5-(1-methylpropyl)-1,3-dioxan-e;

of cyclic ketones such as, for example, 4-tert.-butylcyclohexanone; 2,2,5-trimethyl-5-pentylcyclopentanone; 2-heptylcyclopentanone; 2-pentylcyclopentanone; 2-hydroxy-3-methyl-2-cyclopenten-1-one; 3-methyl-cis-2-penten-1-yl-2-cyclopenten-1-one; 3-methyl-2-pentyl-2-cyclo-penten-1-one; 3-methyl-4-cyclopentadecenone; 3-methyl-5-cyclopentadecenone-; 3-methylcyclopentadecanone; 4-(1-ethoxyvinyl)-3,3,5,5-tetramethylcyclohe-xanone; 4-tert.-pentylcyclohexanone; 5-cyclohexadecen-1-one; 6,7-dihydro-1,1,2,3,3-pentamethyl-4(5H)-indanone; 5-cyclohexadecen-1-one; 8-cyclohexadecen-1-one, 9-cycloheptadecen-1-one; cyclopentadecanone;

of cycloaliphatic aldehydes such as, for example, 2,4-dimethyl-3-cyclohexene carbaldehyde; 2-methyl-4-(2,2,6-trimethylcyclo-hexen-1-yl)-2-butenal; 4-(4-hydroxy-4-methylpentyl)-3-cyclohexene carbaldehyde; 4-(4-methyl-3-penten-1-yl)-3-cyclohexene carbaldehyde;

of cycloaliphatic ketones such as, for example, 1-(3,3-dimethylcyclohexyl)-4-penten-1-one; 1-(5,5-dimethyl-1-cyclohexen-1-yl)-4-penten-1-one; 2,3,8,8-tetramethyl-1,2,3,4,5,6,7,8-octahydro-2-napht-halenyl methyl ketone; methyl-2,6,10-trimethyl-2,5,9-cyclododecatrienyl ketone; tert.-butyl-(2,4-dimethyl-3-cyclohexen-1-yl)ketone;

of esters of cyclic alcohols, such as, for example, 2-tert.-butylcyclohexyl acetate; 4-tert.-butylcyclohexyl acetate; 2-tert.-pentylcyclohexyl acetate; 4-tert.-pentylcyclohexyl acetate; decahydro-2-naphthyl acetate; 3-pentyltetrahydro-2H-pyran-4-yl acetate; decahydro-2,5,5,8a-tetramethyl-2-naphthyl acetate; 4,7-methano-3a,4,5,6,7,7a-hexahydro-5 or 6-indenyl acetate; 4,7-methano-3a,4,5,6,7,7a-hexahydro-5 or 6-indenyl propionate; 4,7-methano-3a,4,5,6,7,7a-hexahydro-5 or 6-indenyl isobutyrate; 4,7-methanooctahydro-5 or 6-indenyl acetate;

of esters of cycloaliphatic carboxylic acids, such as, for example, allyl-3-cyclohexyl propionate; allyl cyclohexyloxyacetate; methyl dihydrojasmonate; methyl jasmonate; methyl-2-hexyl-3-oxocyclopentane carboxylate; ethyl-2-ethyl-6,6-dimethyl-2-cyclohexenecarboxylate; ethyl-2,3,6,6-tetramethyl-2-cyclohexene carboxylate; ethyl-2-methyl-1,3-dioxolan-2-acetate;

of aromatic hydrocarbons such as, for example, styrene and diphenylmethane;

of araliphatic alcohols such as, for example, benzyl alcohol; 1-phenylethyl alcohol; 2-phenylethyl alcohol; 3-phenylpropanol; 2-phenylpropanol; 2-phenoxyethanol; 2,2-dimethyl-3-phenylpropanol; 2,2-dimethyl-3-(3-methylphenyl) propanol; 1,1-dimethyl-2-phenylethyl alcohol; 1,1-dimethyl-3-phenylpropanol; 1-ethyl-1-methyl-3-phenylpropanol-; 2-methyl-5-phenylpentanol; 3-methyl-5-phenylpentanol; 3-phenyl-2-propen-1-ol; 4-methoxybenzyl alcohol; 1-(4-isopropylphenyl)eth-anol;

of esters of araliphatic alcohols and aliphatic carboxylic acids, such as, for example; benzyl acetate; benzyl propionate; benzyl isobutyrate; benzyl isovalerate; 2-phenylethyl acetate; 2-phenylethyl propionate; 2-phenylethyl isobutyrate; 2-phenylethyl isovalerate; 1-phenylethyl acetate; alpha-trichloromethylbenzyl acetate; alpha,alpha-dimethylphenylethyl acetate; alpha-alpha-dimethylphenylethyl butyrate; cinnamyl acetate; 2-phenoxyethyl isobutyrate; 4-methoxybenzyl acetate; of araliphatic ethers such as, for example, 2-phenylethyl methyl ether; 2-phenylethyl isoamyl ether; 2-phenylethyl-1-ethoxyethyl ether; phenylacetaldehyde dimethyl acetal; phenylacetaldehyde dietheyl acetal; hydratropaldehyde dimethyl acetal; phenylacetaldehyde glycerol acetal; 2,4,6-trimethyl-4-phenyl-1,3-dioxane; 4,4a,5,9b-tetrahydroindeno[1,2-d]-m-dioxin; 4,4a,5,9b-tetrahydro-2,4-dimethylindeno[1,2-d]-m-dioxin; of aromatic and araliphatic aldehydes, such as, for example, benzaldehyde; phenyl acetaldehyde; 3-phenylpropanal; hydratropaldehyde; 4-methylbenzaldehyde; 4-methylphenyl acetaldehyde; 3-(4-ethylphenyl)-2,2-dimethylpropanal; 2-methyl-3-(4-isopropylphenyl)pro-panal; 2-methyl-3-(4-tert.-butylphenyl)propanal; 3-(4-tert.-butylphenyl) propanal; cinnamaldehyde; alpha-butylcinnamaldehyde; alpha-amylcinnamaldehyde; alpha-hexylcinnamaldehyde; 3-methyl-5-phenylpentanal; 4-methoxybenzaldehyde; 4-hydroxy-3-methoxybenz-aldehyde; 4-hydroxy-3-ethoxybenzaldehyde; 3,4-methylenedioxybenzaldehyde; 3,4-dimethoxybenzaldehyde; 2-methyl-3-(4-methoxyphenyl)-propanal; 2-methyl-3-(4-methylenedioxyphenyl)propanal;

of aromatic and araliphatic ketones, such as, for example, acetophenone; 4-methylacetophenone; 4-methoxyacetophenone; 4-tert.-butyl-2,6-dimethylacetophenone; 4-phenyl-2-butanone; 4-(4-hydroxyphenyl)-2-butanone; 1-(2-naphthalenyl)ethanone; benzophenone; 1,1,2,3,3,6-hexamethyl-5-indanyl methyl ketone: 6-tert.-butyl-1,1-dimethyl-l-4-indanyl methyl ketone; 1-[2,3-dihydro-1,1,2,6-tetramethyl-3-(1-methyle-thyl)-1H-5-indenyl]ethanone; 5',6',7',8'-tetrahydro-3',5',5',6',8',8'-hexamethyl-2-acetonaphthone;

of aromatic and araliphatic carboxylic acids and esters thereof, such as, for example, benzoic acid; phenylacetic acid, methyl benzoate; ethyl benzoate; hexyl benzoate; benzyl benzoate; methyl phenyl acetate; ethyl phenyl acetate; geranyl phenyl acetate; phenyl ethyl phenylacetate; methyl cinnamate; ethyl cinnamate; benzyl cinnamate; phenylethyl cinnamate; cinnamyl cinnamate; allyl phenoxyacetate; methyl salicylate; isoamyl salicylate; hexyl salicylate; cyclohexyl salicylate; cis-3-hexenyl salicylate; benzyl salicylate; phenylethyl salicylate; methyl-2,4-dihydroxy-3,6-dimethylbenzoate; ethyl-3-phenylglycidate; ethyl-3-methyl-3-phenylglycidate;

of nitrogen-containing aromatic compounds such as, for example, 2,4,6-trinitro-1,3-dimethyl-5-tert.-butylbenzene; 3,5-dinitro-2,6-dimethyl-4-tert.-butylacetophenone; cinnamonitrile; 5-phenyl-3-methyl-2-pentene nitrile; 5-phenyl-3-methylpentane nitrile; methyl anthranilate; methyl-N-methyl anthranilate; Schiff's bases of methyl anthranilate with 7-hydroxy-3,7-dimethyl octanal, 2-methyl-3-(4-tert.-butylphenyl)propanal or 2,4-dimethyl-3-cyclohexenecarbaldehyde; 6-isopropylquinoline; 6-isobutylquinoline; 6-sec.-butylquinoline; indole; skatole; 2-methoxy-3-isopropylpyrazine; 2-isobutyl-3-methoxypyrazine;

of phenols, phenyl ethers and phenyl esters, such as, for example, estragole; anethole; eugenol; methyl eugenol; isoeugenol; methyl isoeugenol; thymol; carvacrol; diphenyl ether; beta-naphthyl methyl ether; beta-naphthyl ethyl ether; beta-naphthyl isobutyl ether; 1,4-dimethoxybenzene; eugenyl acetate; 2-methoxy-4-methylphenol; 2-ethoxy-5-(1-propenyl) phenol; p-cresylphenyl acetate;

of heterocyclic compounds such as, for example, 2,5-dimethyl-4-hydroxy-2H-furan-3-one; 2-ethyl-4-hydroxy-5-methyl-2H-fura-n-3-one; 3-hydroxy-2-methyl-4H-pyran-4-one; 2-ethyl-3-hydroxy-4H-pyran-4-o-ne;

of lactones such as, for example, 1,4-octanolide; 3-methyl-1,4-octanolide; 1,4-nonanolide; 1,4-decanolide; 8-decen-1,4-olide; 1,4-undecanolide; 1,4-dodecanolide; 1,5-decanolide; 1,5-dodecanolide; 1,15-pentadecanolide; cis- and trans-11-pentadecen-1,15-olide; cis- and trans-12-pentadecen-1,15-olide; 1,16-hexadecanolide; 9-hexadecen-1,16-olide; 10-oxa-1,16-hexadecanolide; 11-oxa-1,16-hexadecanolide; 12-oxa-1,16-hexadecanolide; ethylene-1,12-dodecanedioate; ethylene-1,13-tridecanedioate; coumarin; 2,3-dihydrocoumarin; octahydrocoumarin; Examples of flavour substances which may be a constituent of the aroma are, in addition to all the aforementioned substances, primarily the following substances classes: aliphatic esters (saturated and unsaturated), for example ethyl butyrate, allyl capronate; aromatic esters, for example benzyl acetate, methyl salicylate; organic aliphatic acids (saturated and unsaturated), for example butyric acid, ethanoic acid, hexanoic acid; organic aromatic acids; aliphatic alcohols (saturated and unsaturated), for example ethanol, propylene glycol, octenol; cyclic alcohols, for example menthol; aromatic alcohols, for example benzyl alcohol; aliphatic aldehydes (saturated and unsaturated), for example acetaldehyde, nonadienal; aromatic aldehydes, for example benzaldehyde; ketones, for example menthone; cyclic ethers, for example 4-hydroxy-5-methylfuranone; aromatic ethers, for example p-methoxybenzaldehyde; guaiacol; phenolic ethers, for example methoxyvinyl phenol; acetals, for example acetaldehyde diethyl acetal; lactones, for example γ-decalactone; terpenes, for example, limonene, linalool, terpinene, terpineol, citral (geranial and neral); sulfides, for example dimethyl sulfide; thiols, for example methylfuran thiol; disulfides, for example difurfuryl disulfide; pyrazines, for example methylpyrazine, acetyl pyrazine.

The aroma particles may contain substances or substance mixtures, which are active in nutritional physiology (neutriceuticals). The following might be named by way of example: panthenol, pantothenic acid, essential fatty acids, vitamin A and derivatives, carotenes, vitamin C (ascorbic acid), vitamin E (tocopherol) and derivatives, vitamins of the B and D series, such as vitamin $B_6$ (nicotinamide), vitamin $B_{12}$, vitamin $D_1$, vitamin $D_3$, vitamin F, folic acid, biotin, amino acids, compounds of the elements magnesium, silicon, phosphorus, calcium, manganese, iron or copper, coenzyme Q10, unsaturated fatty acids, ω-3-fatty acids, polyunsaturated fatty acids, γ-linolenic acid, oleic acid, eicosapentaenoic acid, docosahexaenoic acid and derivatives thereof, bisabolene, chloramphenicol, caffeine, capsaicin, prostaglandins, thymol, camphor, extracts or other products of plant and animal origin, for example evening primrose oil, borage oil or blackcurrant seed oil, fish oils, fish-liver oil, ceramides and ceramide-like compounds, plant extracts such as, for example, arnica, aloe, beard lichen, ivy, nettle, ginseng, henna, camomile, calendula, rosemary, sage, equisetum or thyme. Oils such as apricot kernel oil, avocado oil, babassu oil, cottonseed oil, borage oil, thistle oil, groundnut oil, gamma-oryzanol, rose-hip seed oil, hemp oil, hazelnut oil, blackcurrant seed oil, jojoba oil, cherry kernel oil, salmon oil, linseed oil, maize germ oil, macadamia nut oil, almond oil, evening primrose oil, mink fat, olive oil, pecan nut oil, peach kernel oil, pistachio nut oil, rape-seed oil, rice germ oil, castor oil, safflower seed oil, sesame seed oil, soybean oil, sunflower seed oil, tea tree oil, grape-seed oil or wheat germ oil.

It is of course possible for the aroma particles according to the invention to contain additionally other substances such as, for example, emulsifiers, colorants, antioxidants, stabilisers, UV-filters, vitamins and other ingredients which are conventional in the food, cosmetics or olfactory substance industries.

Suitable antioxidants are, for example, amino acids (for example, glycin, histidine, tyrosine, tryptophan) and derivatives thereof, imidazoles (for example urocanic acid) and derivatives thereof, peptides such as D,L-carnosine, D-carnosine, L-carnosine and derivatives thereof (for example anserine), carotinoids, carotenes (for example α-carotene, β-carotene, lycopene) and derivatives thereof, lipoic acid and derivatives thereof (for example dihydro-α-lipoic acid), aurothioglucose, propyl thiouracil and other thiols (for example thioredoxin, glutathione, cysteine, cystine, cystamine and glycosyl, N-acetyl, methyl, ethyl, propyl, amyl, butyl and lauryl, palmitoyl, oleyl, γ-linoelyl, cholesteryl, glyceryl and olioglyceryl esters thereof) as well as salts thereof, dilauryl thiodipropionate, distearyl thiodipropionate, thiodipropionic acid and derivatives thereof (esters, ethers, peptides, lipids, nucleotides, nucleosides and salts) as well as sulfoximine compounds (for example buthionine sulfoximines, homocysteine sulfoximine, buthionine sulfones, penta-, hexa-, heptathionine sulfoximine) in very small compatible doses (for example pmol to. mu.mol/kg), furthermore (metal) chelating agents (for example α-hydroxy fatty acids, palmitic acid, phytic acid, lactoferrin), α-hydroxy acids (for example citric acid, lactic acid, malic acid), humic acid, bile acid, bile extracts, bilirubin, biliverdin, EDTA, EGTA and derivatives thereof, unsaturated fatty acids and derivatives thereof (for example γ-linolenic acid, linoleic acid, oleic acid), folic acid and derivatives thereof, ubiquinone and ubiquinol and derivatives thereof, vitamin C and derivatives (for example ascorbyl palmitate, magnesium ascorbyl phosphate, ascorbyl acetate), tocopherols and derivatives (for example vitamin E acetate), vitamin A and derivatives (vitamin A palmitate) as well as conyferyl benzoate of benzoin resin, rutinic acid and derivatives thereof, ferulic acid and derivatives thereof, butylhydroxytoluene, butylhydroxyanisole, nordihydroguaiac resin acid, nordihydroguaiaretic acid, trihydroxybutyrophenone, uric acid and derivatives thereof, mannose and derivatives thereof, zinc and derivatives thereof (for example ZnO, ZnSO.sub.4), selenium and derivatives thereof (for example selenium methionine), stilbenes and derivatives thereof (for example stilbene oxide, trans-stilbene oxide) and those derivatives (salts, esters, ethers, sugars, nucleotides, nucleosides, peptides and lipids) of these named active ingredients, which are suitable according to the invention.

Suitable light stabilisers are, for example, organic UV absorbers from the class of 4-aminobenzoic acid and derivatives, salicylic acid derivatives, benzophenone derivatives, dibenzoylmethane derivatives, diphenyl acrylates, 3-imidazol-4-yl acrylic acid and esters thereof, benzofurane derivatives, benzylidene malonate derivatives, polymeric UV absorbers, containing one or more organosilicon radicals, cinnamic acid derivatives, camphor derivatives, trianilino-s-triazine derivatives, 2-hydroxyphenyl benzotriazole derivatives, 2-phenylbenzimidazole-5-sulfon-ic acid and salts thereof, anthranilic acid menthyl esters, benzotriazole derivatives.

The following might be named as examples of suitable cooling substances: 1-menthol, menthone glycerol acetal, menthyl lactate, substituted menthyl-3-carboxylic acid amides (for example menthyl-3-carboxylic acid-N-ethylamide), 2-isopropyl-N,2,3-trimethylbutan-amide, substituted cyclohexane carboxylic acid amides, 3-menthoxypropane-1,2-diol, 2-hydroxyethylmenthyl carbonate, 2-hydroxypropylmenthyl carbonate, N-acetylglycine menthyl ester, menthylhydroxycarboxylic acid esters (for example menthyl-3-hydroxybutyra-te), monomenthyl succinate 2-mercaptocyclodecanone, menthyl-2-pyrrolidin-5-one carboxylate.

The melts obtainable by the process according to the invention are still flowable such that the melt can be discharged through small openings at feasible temperatures and not excessive extrusion pressure, without leading to undesirable aroma losses. The melt discharged from the extruder enables effective die-face pelletisation to be carried out virtually without cutting losses. Cutting losses are understood to be those aroma particles which do not fall within the desired particle size fraction.

The preferred type of extruder is a twin-screw extruder.

The openings at the extruder exit, through which the melt is delivered, may be of any form and size. Round openings having a diameter of from 0.1 to 5 mm, preferably 0.2 to 2.5 mm, in particular preferably 0.3 to 1.5 mm, are preferred. Perforated disks are normally used.

The aroma particles obtained have an apparent density of from 0.5 to 1.5 kg/l, preferably 0.7 to 0.9 kg/l.

In the present invention a die-face pelletisation of the melt discharged from the extruder in a flowable, still unsolidified state is carried out in the immediate spatial proximity of the extruder exit. For this purpose the manner in which the comminution is undertaken is immaterial. The comminution may thus take place by means of knives, wires or some other cutting tool. The direction of motion of the cutting tools may be designed to be vertical, horizontal or in both directions, as well as rotary.

The die-face pelletisation of the melt according to the invention enables a homogeneous product having a narrow, regulated particle size distribution to be prepared and simultaneously to a large extent eliminates the occurrence of the undesirable dusty fines, confining it to less than 2 wt. %.

For example, the process according to the invention may be carried out in the following stages:

a. Melt the Matrix

A suitable dry matrix containing from 30 to 70 wt. % carbohydrate polymers is prepared and is melted in an extruder by heating to 80 to 120° C., preferably 90 to 100° C. For this purpose a twin-screw extruder having a plurality of temperature zones is preferably used, for example having the following settings: temperature $1^{st}$ zone 75° C., temperature $2^{nd}$ zone 90° C., temperature $3^{rd}$ zone 40° C., temperature die 100 to 120° C., depending on pressure and flow rate.

b. Emulsify the Aroma into the Dry Mixture

The aroma, which may contain additionally a suitable emulsifier as well as other ingredients, is introduced continuously by way of a pump into the front region of the extruder at a dose of preferably from 1 to 25, for preference 3 to 10 wt. %, with reference to the dry mixture. The extrusion dies effect the emulsification of the aroma and the optionally present further ingredients in the melt.

The melting of the dry materials is controlled by the heating of the housings and the frictional heat of the rotation of the screws. A suitable screw configuration regulates the degree of charging and the residence time of the mixtures in the extruder.

The degree of charging, the residence time, the mixing efficiency, the frictional heat generated and the material pressure can be influenced with the aid of the screw speed.

c. Discharge from the Extruder

In order to shape the strands downstream of the opening, the melt must be cooled. This is preferably effected by blowing cold air in concentric manner onto the perforated disk. Here, uniform temperature control of the opening must be ensured.

A minimum pressure of 20 bar must be produced upstream of the die, in order to enable delivery to be uniform with no pulsing. The ideal pressure range is between 35 and 55 bar. The liquid aroma must not be added until the cooled region of the extruder, since otherwise backing-up, or boiling of volatile constituents, may occur.

Experience dictates that the product temperature upstream of the die should be between 94 and 105° C. If the temperature is too low the viscosity of the melt, and the material pressure, increases, thus permitting only low-performance operation. If the temperature is too high the emerging strands are too soft and sticky, thus rendering pelletisation impossible.

The dies must be of conical design and have the smoothest possible surface within the channels. A coated outer skin increases the life of the die plates.

d. Formation of the Aroma Particles

The comminution of the strands takes place while still in the solidification phase by means a of die-face pelletisation. For this purpose, a gas-tight implementation of the die-face pelletisation having rotating cutting knives is used, which takes place directly at the extruder exit. Infinitely variable control of the die-face pelletisation enables the particle length to be adjusted dependent on the solids flow rate. For a smooth cut, the knife shaft of the pelletiser should run flexibly and be spring-mounted. The knife blades must present a smooth surface to the die plate on which they bear. The speed of rotation of the knives should be between 2500 and 3000 rpm. As a result of the high cutting speeds a cooling effect, necessary for a permanently good cut, is generated by way of the rotation. The knife blades themselves may have a metal thickness of from 0.5 to 1.0 mm.

The aromas can normally be released from the aroma particles by humidity, water, temperature or combinations thereof.

The aroma particles according to the invention can be used, for example, for aromatising foods or oral hygiene products, such as instant beverage powders, teas, soup or sauce powders, confectionery, chewing-gums, toothpastes, oral gels, chewable tablets or chewable sweets.

The aroma particles according to the invention can be used, for example, for atomising pharmaceuticals and pharmaceutical formulations, such as sweets for sucking, tablets for sucking, chewable sweets, chewable tablets, tablets to be dissolved in water or infusion formulations.

The aroma particles according to the invention can be used, for example, for aromatising consumer articles such as cosmetics, soaps, detergents, washing agents, room fragrancers, hygienic or household products.

EXAMPLES

Preparation Examples

Example 1 Preparation of Lemon Aroma Particles

A suitable carbohydrate mixture is melted in a twin-screw, TO-EX 45-type extruder from Togum, having nine housing blocks and a plurality of separately temperature-controllable zones having the following operating conditions:

| | |
|---|---|
| heating temperature $1^{st}$ zone | 75° C. |
| heating temperature $2^{nd}$ zone | 90° C. |
| heating temperature $3^{rd}$ zone | 40° C. |
| heating temperature die | 100 to 120° C., depending on pressure and flow rate |
| product temperature entering $1^{st}$ zone | room temperature |
| product temperature entering $2^{nd}$ zone | 60° C. |
| product temperature entering $3^{rd}$ zone | 120° C. |
| product temperature entering die | 110° C. |
| product temperature entering $1^{st}$ zone | e.g. 96° C. (90 to 110° C.) |
| screw speed | 100 rpm |
| dry substance flow rate | 30 kg/h |
| lemon aroma flow rate | 1.8 kg/h |

The carbohydrate mixture comprises the raw materials Glucidex IT 47 W from wheat (from Roquette; monosaccharides 0.7%, disaccharides 56.3%, trisaccharides 18.7%, tetrasaccharides 1.8%, oligosaccharides from the pentasaccharides upwards, having a molecular weight of over 1000, 22.5%) as well as Maltodextrin DE 15-19 from wheat (from Cerestar, monosaccharides 0.4%, disaccharides 5.0%, trisaccharides 9.5%, tetrasaccharides 5.0%, pentasaccharides 4.8%, hexasaccharides 11.4%, oligosaccharides from the heptasaccharides upwards 63.9%).

A suitable formulation contains 8340 g Glucidex IT 47 W from wheat, 3600 g Maltodextrin DE 15-19 from wheat and 60 g Monomuls (from Grunau-Illertissen, molecularly distilled monoglyceride based on palm oil, E471). It has a calculated 33.50% content of oligosaccharides greater than DP 6. The aroma, to which is added 3% of the emulsifier Tween 80 (from ICI, polyoxyethylene-(20)-sorbitan monooleate or polysorbate 80), is introduced continuously into the front region of the extruder at a dose of, for example, 6%, with reference to the dry mixture, by way of a supply by electromechanical reciprocating metering pump at a pressure of approximately 30 to 35 bar. The extrusion dies effect the emulsification of the aroma in the melt.

Cold air is blown onto the perforated disk in concentric manner. Here, care must be taken to ensure uniform temperature control, such that no spot cooling occurs. The die-face pelletisation is implemented in gas-tight manner in order to prevent aroma contamination of the environment. 3 knives of 0.5 mm sheet steel and a pelletising plate having 600 drilled holes of nominal diameter Ø1.0 and 1000*Ø0.6 drilled holes on concentric circles are utilised for the preparation of aroma particles of nominal particle size 1 mm. The die-face pelletisation rotation speed, for adjusting the pellet length, is infinitely variable dependent on the solids flow rate. The pellets obtained here have an apparent density of approx. 0.8 to 0.9 kg/l. Dust and/or oversized particles are then removed by a doubledeck sieve having 0.8 mm and 1.25 mm sieve sizes. The sieving losses are less than 5% of yield.

Example 2 Preparation of Passion Fruit Aroma Particles

A further suitable formulation having 4740 g Glucidex maize, 3600 g maltodextrin maize, 1400 g spray-dried glucose from maize, 200 g gum arabic and 60 g Monomuls has a calculated 39.70% content of oligosaccharides greater than DP 6. The Cerestar spray-dried glucose from maize has the trade name C*Dry GL 01934 and comprises 11.5% monosaccharides, 40.1% disaccharides, 21.0% trisaccharides, 8.7% tetrasaccharides, 3.2% pentasaccharides and 1.0% hexasaccharides as well as 24.5% oligosaccharides from the heptasaccharides upwards. 6% aroma with 2% Tween 80 emulsifier are introduced into the front region of the extruder. The operating conditions of the TO-EX 45 twin-screw extruder are as follows:

| | |
|---|---|
| 2 heating temperature $1^{st}$ zone | 75° C. |
| heating temperature $2^{nd}$ zone | 90° C. |
| heating temperature $3^{rd}$ zone | 40° C. |
| heating temperature die | 100 to 120 C., depending on pressure and flow rate |
| product temperature entering $1^{st}$ zone | room temperature |
| product temperature entering $2^{nd}$ zone | 60° C. |
| product temperature entering $3^{rd}$ zone | 120° C. |
| product temperature entering die | 110° C. |
| product temperature entering $1^{st}$ zone | e.g. 96° C. (90 to 110° C.) |
| screw speed | 100 rpm |
| dry substance flow rate | 30 kg/h |
| passion fruit aroma flow rate | 1.8 kg/h |

3 knives of 0.5 mm sheet steel and a pelletising plate having 1000 drilled holes of nominal diameter Ø0.6 on concentric circles are utilised for the preparation of aroma particles of nominal particle size 0.6 mm. The pellets obtained here have an apparent density of approx. 0.8 to 0.9 kg/l. Dust and/or oversized particles are then removed by a doubledeck sieve having 0.5 mm and 1.0 mm sieve sizes. The sieving losses are less than 5% of yield.

The two Preparation Examples above show embodiments of the invention by way of example. The Maltodextrin DE 15-19 should be regarded as carbohydrate polymers having an average molecular weight greater than 1000, while the two glucose syrups are on average markedly below a molecular weight of 1000. The procedure is transferable to any other flavours, but also to fragrance oils. Using the same procedure, it is furthermore possible to prepare larger particle sizes of up to several millimeters as well as smaller particle sizes up to 0.3 mm.

Application Examples

Example 3 Tea-Bag Tea

Aromatisation of black tea in tea-bags with 3 wt. % lemon aroma particles (Ø1 mm, length 1 to 2 mm). During storage of the tea, the aroma remains enclosed in the pellet matrix and is not released until, on brewing, the particle matrix is dissolved in hot water.

Example 4 Instant Beverage Powder

Aromatisation of an instant beverage powder mixture comprising 90 wt. % saccharose, 8 wt. % citric acid, 1 wt. % further ingredients (calcium phosphate, ascorbic acid, modified cellulose, colorant) and 1 wt. % yellow-coloured passion fruit aroma particles (Ø0.6 mm) which have been prepared by the procedure described. The mixture is distinguished by particularly good stability of the aroma in storage, even at low particle size. Because of the small proportion of oxidation-sensitive passion fruit aroma at the surface of the particles, the occurrence of off-flavours (caused by oxidation) is very greatly minimised.

Example 5 Chewing-Gum

Blue-coloured peppermint aroma particles (Ø0.6 mm, length 0.4 mm) prepared by the process described are added to chewing-gum mass. The particles create a particular optical effect. The aroma is released in mechanical manner during chewing.

Example 6 Temperature-Controlled Fragrance Release

Uncoloured perfume oil particles (Ø0.6 mm, length 0.4 mm) which have been prepared by the process described are added to a heating and cooling plate. The perfume oil is released by heating. The release of the perfume oil can be started and stopped repeatedly by a heating and cooling cycle until the perfume oil is completely consumed.

Example 7 Soap

Uncoloured perfume oil particles (Ø0.6 mm, length 0.4 mm) prepared by the process described are added to a soap. The perfume oil is released by dissolution. The release of the perfume oil can be started and stopped repeatedly by a solubilisation and drying until the soap is completely consumed.

The invention claimed is:

1. Aroma particles comprising a matrix and an aroma that have been prepared by extrusion of an aromatised melt followed by die-face pelletisation while the aromatised melt is still in an unsolidified state, wherein the matrix of the aroma particles contains from 20 to 80 wt. % carbohydrate polymers having an average molecular weight greater than 1000, and glucose in a quantity of from 0.5 to 5 wt. %, based on the total weight of the melt.

2. Aroma particles according to claim 1, wherein the matrix of the aroma particles contains from 30 to 70 wt. % carbohydrate polymers having an average molecular weight greater than 1000.

3. Aroma particles according to claim 1, wherein the matrix of the aroma particles contains from 40 to 60 wt. % carbohydrate polymers having an average molecular weight greater than 1000.

4. Aroma particles according to claim 1, wherein the matrix of the aroma particles contains an emulsifier.

5. Aroma particles according to claim 4, wherein the matrix contains monoglycerides in a quantity of from 0.5 to 3 wt. %.

6. Aroma particles according to claim 1, wherein aroma particles have a glass transition temperature within the range 30 to 100° C.

7. Aroma particles according to claim 1, wherein the matrix of the aroma particles contains 30 to 70 wt-% water-soluble compounds having molecular weights within the range of 90 to 950.

8. Aroma particles comprising a matrix and an aroma that have been prepared by extrusion of an aromatised melt followed by die-face pelletisation at the die-face while the aromatised melt is still in an unsolidified state, wherein the matrix of the aroma particles contains:
   30 to 70 wt. % carbohydrate polymers having an average molecular weight greater than 1000, and
   30 to 70 wt-% water-soluble compounds having molecular weights within the range of 90 to 950, and glucose in a quantity of from 0.5 to 5 wt. %, based on the total weight of the aromatised melt.

9. Aroma particles according to claim 8, wherein the matrix of the aroma particles contains from 40 to 60 wt. % carbohydrate polymers having an average molecular weight greater than 1000, and
   40 to 60 wt-% water-soluble compounds having molecular weights within the range of 90 to 950, based on the total weight of the aromatised melt.

10. Aroma particles according to claim 8, wherein the matrix of the aroma particles contains an emulsifier.

11. Aroma particles according to claim 10, wherein the matrix contains monoglycerides in a quantity of from 0.5 to 3 wt. %.

12. Aroma particles according to claim 8, wherein said particles have a glass transition temperature within the range 30 to 100° C.

* * * * *